Sept. 2, 1930.   F. E. HALL ET AL   1,774,918
HOSE CONNECTER FOR AIR PUMPS AND THE LIKE
Filed Aug. 1, 1929
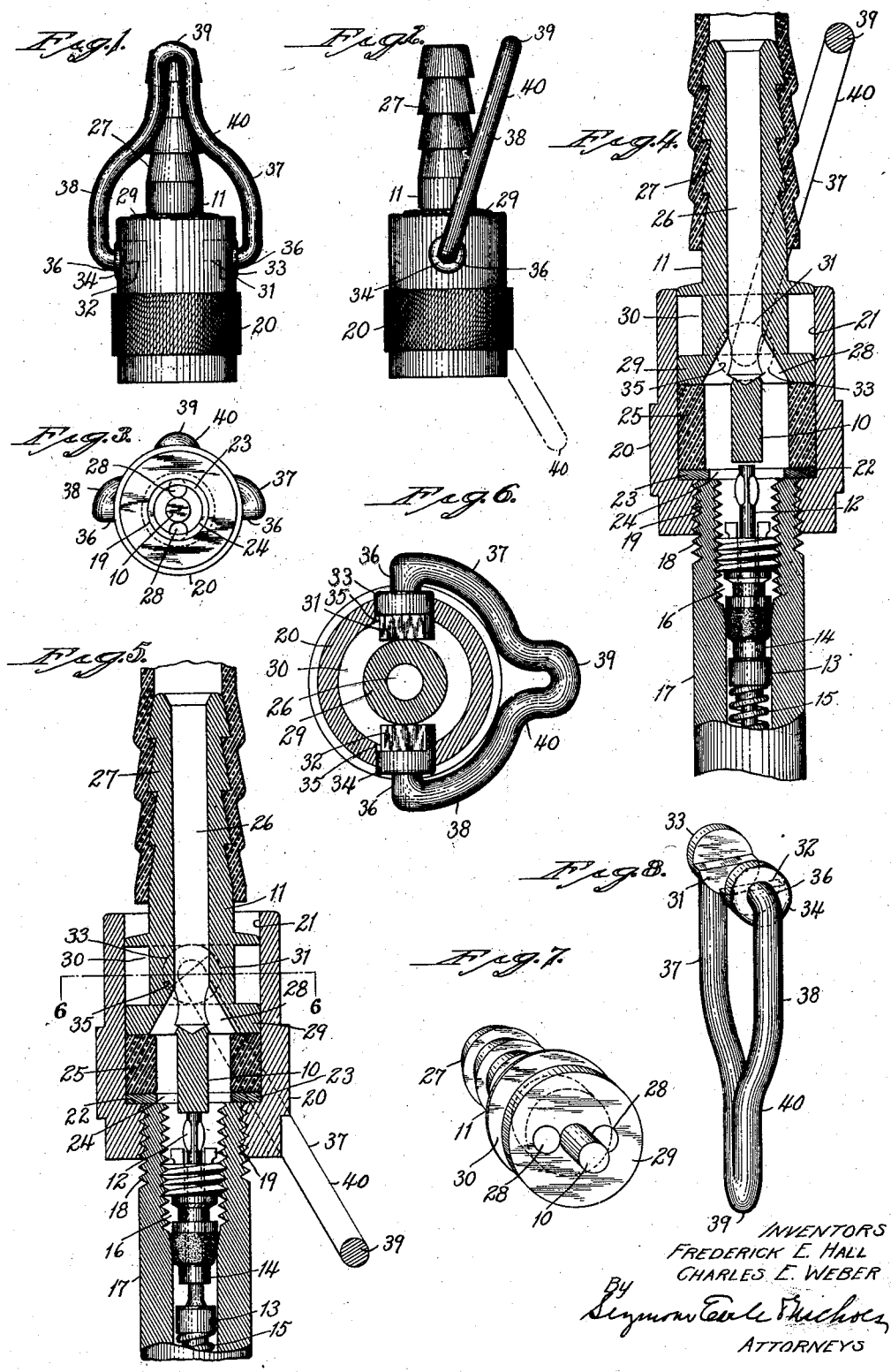
INVENTORS
FREDERICK E. HALL
CHARLES E. WEBER
BY
ATTORNEYS Patented Sept. 2, 1930

1,774,918

UNITED STATES PATENT OFFICE

FREDERICK E. HALL, OF NORTH EASTON, MASSACHUSETTS, AND CHARLES E. WEBER, OF WATERBURY, CONNECTICUT, ASSIGNORS TO THE CHASE COMPANIES, INCORPORATED, OF WATERBURY, CONNECTICUT, A CORPORATION

HOSE CONNECTER FOR AIR PUMPS AND THE LIKE

Application filed August 1, 1929. Serial No. 382,650.

This invention relates to an improvement in hose connecters for air-pumps and the like and is particularly adapted for use in connecting the hose of pumps to tire-valves and the like, though not so limited.

The main object of this invention is to provide a connecter in which manually-operable means available from the outside of the connecter is provided for forcing open the valve-plunger of a tire-valve or the like after the connecter has been sleeved over the tire-valve structure, so that the resistance offered to the passage of air by a "stuck" valve-plunger may be avoided and appreciable leakage during the opening of the said valve-plunger minimized.

With the above and other objects in view, our invention consists in a connecter for air-pumps and the like having certain details of construction and combinations of parts as will be hereinafter described and particularly recited in the claims.

In the accompanying drawings:

Fig. 1 is a view in front elevation of a hose-connecter embodying our invention;

Fig. 2 is a view thereof in side elevation;

Fig. 3 is an underside view thereof;

Fig. 4 is an enlarged-scale view in longitudinal section showing our improved connecter as applied to the nipple of a tire-valve and having a hose connected to its inner end, the parts being shown in the positions due them when the valve-opening plunger is in its retracted position;

Fig. 5 is a similar view but showing the parts in the positions due them when the valve-opening plunger is moved downward to move the plunger-valve head of the tire-valve into its open position;

Fig. 6 is a transverse sectional view on the line 6—6 of Fig. 5;

Fig. 7 is a detached perspective view of the hose-nipple member; and

Fig. 8 is a corresponding view of the two-armed operating-lever.

In carrying out our invention as herein shown, we employ a valve-opening member in the form of a plunger 10 formed integral with and projecting downward from the inner end of a tubular hose-nipple 11 and adapted as will hereinafter appear to engage the stem 12 of a plunger-valve head 13 forming a usual feature of a tire-valve and requiring no detailed description herein other than the following.

The upper face of the plunger-valve head 13 is adapted to engage a seat-member 14 under the urge of a helical spring 15. The parts 12 to 15 inclusive just referred to are positioned within the axial bore 16 of a tire-valve nipple 17 which is formed near its upper end with external screw-threads 18 adapted to be threaded into an internally-threaded opening 19 formed in the lower end of the cup-shaped body-member 20 of our improved connecter.

The body-member 20 is formed with a cylindrical chamber 21 which opens through its inner end and terminates at its outer end in a transverse shoulder 22 which is also intersected by the internally-threaded opening 19. Resting upon the shoulder 22 aforesaid so as to slightly overhang the opening 19 for the purpose of being engaged by the upper end of the valve-nipple 17, is a sealing-washer 23 having a central-opening 24 for the passage of air and having superimposed upon it a tubular ring 25 of rubber or equivalent resilient material.

The upper edge of the resilient ring 25 is engaged by the underface of the inner end of the hose-nipple 11 and serves to prevent the escape of air outward through the open inner end of the chamber 21, as will hereinafter appear.

The hose-nipple 11 is formed with an axial air-passage 26 which extends from the extreme outer end of the transversely-corrugated shank 27 of the said nipple to a point just short of the inner end thereof, where it is intersected by two (more or less) inclined air-ports 28 opening through the under-face of the said hose-nipple on opposite sides of the valve-opening plunger 10.

The outer end or head-portion 29 of the hose-nipple 11 is formed with an annular circumferential groove 30 which is adapted to receive at diametrically-opposite points respectively (Fig. 6) two eccentrically-positioned operating-lugs 31 and 32 which form inwardly-projecting extensions of trunnion-heads 33 and 34 respectively, bearing in radial openings 35, one of which latter is formed in each of the opposite side-walls of the body-member 20.

The two complementary trunnion-heads 33 and 34 are respectively carried by the inwardly-turned reaches 36 of side-arms 37 and 38 which latter, together with the finger-piece 39 uniting them, form a U-shaped operating-lever which, for purposes of description, will be designated in its entirety by the numeral 40.

In the use of the hose-connecter herein chosen for the purpose of illustrating our invention, the outer end of the body-member 20, which latter is free for relative rotary and limited longitudinal movement with respect to the hose-nipple 11, is screwed upon the threaded outer end 18 of the tire-valve nipple 17 preferably a distance sufficient to cause the upper end of the said nipple to engage the underface of the sealing-washer 23.

With our connecter thus in place, as shown in Fig. 4, the operating-lever 40 is swung downward from the position shown in the said figure to the position shown in Fig. 5, with the effect of causing its operating-lugs 31 and 32 to depress the hose-nipple 11.

The described downward movement of the hose-nipple 11 serves to engage the outer end of the valve-opening plunger 10 with the end of the stem 12 of the plunger valve-head 13, causing the latter to move away from the seat-member 14 against the counterurge of the spring 15, so as to permit the ready entry of air into the tire.

As the hose-nipple 11 is moved downward to force the valve-head 13 from its seat, as above described, the resilient ring 25 is compressed so as to more effectively prevent the outward escape of air between the wall of the chamber 21 and the periphery of the head-portion 29 of the hose-nipple. The parts will now occupy the positions shown in Fig. 5.

When it is desired to uncouple the connecter from the valve-nipple 25, the operating-lever 40 is swung upward from the position shown in Fig. 5 to the position shown in Fig. 4 to permit the spring 15 to re-seat the valve-head 13. The entire connecter may now be removed from the nipple 17 by reversely rotating the body-member 20 without having permitted any appreciable amount of air to escape from the tire or similar article which has just been inflated.

While we have shown our improved hose-connecter as adapted to be connected to a tire-valve by threading it thereupon, it is obvious without illustration that other means may be employed for the purpose without departing from our invention, which resides in the manually-operable plunger 10 or its equivalent, which is capable of being operated after the hose-connecter has been sleeved over the said tire-valve.

Furthermore, while we have shown and described herein an improved connecter designed to be applied to the end of a hose, it is obvious that it may be rigidly attached to a portable pump-structure, if desired, without impairing its usefulness.

We claim:

1. A hose-connecter comprising a body-member adapted to be sleeved over and connected to a valve-nipple; a hose-nipple mounted in the said body-member with capacity for movement therein; a valve-opening plunger carried by the outer end of the said hose-nipple in position to engage a reciprocating valve-stem to depress the same; and an operating-member available for manipulation from the outside of the hose-connecter structure and operatively connected to the said hose-nipple for effecting the movement of the said plunger; whereby a valve may be forced open after the connecter has been applied to a valve-nipple or the like to permit the ready passage of air therethrough without appreciable leakage during the valve-opening operation.

2. A hose-connecter comprising a hollow body-member formed with an internal shoulder and adapted to be sleeved over and connected to a valve-nipple; a hose-nipple mounted in the said body-member with capacity for movement therein; a tubular ring of resilient material interposed between the shoulder in the said body-member and the said hose-nipple; a valve-opening plunger carried by the outer end of the said hose-nipple in position to engage and depress a reciprocating valve-stem; and an operating-member available for manipulation from the outside of the hose-connecter structure and operatively connected to the said hose-nipple for effecting the movement of the said plunger against the counterurge of the said resilient ring.

In testimony whereof, we have signed this specification.

FREDERICK E. HALL.
CHARLES E. WEBER.